(12) United States Patent  
Sander

(10) Patent No.: US 7,199,923 B2  
(45) Date of Patent: Apr. 3, 2007

(54) STEREOMICROSCOPE

(75) Inventor: Ulrich Sander, Rebstein (CH)

(73) Assignee: Leica Microsystems (Schweiz) AG, Heerbrugg (CH)

(*) Notice: Subject to any disclaimer, the term of this patent is extended or adjusted under 35 U.S.C. 154(b) by 0 days.

(21) Appl. No.: 10/536,602

(22) PCT Filed: Nov. 28, 2003

(86) PCT No.: PCT/EP03/13403

§ 371 (c)(1),
(2), (4) Date: May 26, 2005

(87) PCT Pub. No.: WO2004/051342

PCT Pub. Date: Jun. 17, 2004

(65) Prior Publication Data

US 2006/0012854 A1    Jan. 19, 2006

(30) Foreign Application Priority Data

Nov. 29, 2002 (DE) .................. 102 55 965

(51) Int. Cl.
*G02B 21/22* (2006.01)
*G02B 21/00* (2006.01)
(52) U.S. Cl. .................. 359/376; 359/368; 359/380; 359/431
(58) Field of Classification Search ........ 359/368–390, 359/831–837, 431; 351/200–247
See application file for complete search history.

(56) References Cited

U.S. PATENT DOCUMENTS

| 3,458,244 | A | * | 7/1969 | Klein | 359/380 |
| 3,459,464 | A | * | 8/1969 | Smith | 359/376 |
| 4,175,826 | A | * | 11/1979 | Blaha et al. | 359/377 |
| 4,299,439 | A | * | 11/1981 | Stromblad | 359/384 |
| 4,547,047 | A | * | 10/1985 | Koike et al. | 359/375 |
| 4,576,450 | A | * | 3/1986 | Westphal | 359/384 |
| 5,822,114 | A | | 10/1998 | Hanzawa | |
| 6,097,538 | A | * | 8/2000 | Watanabe et al. | 359/390 |

FOREIGN PATENT DOCUMENTS

EP    1 120 676 A2    8/2001

* cited by examiner

*Primary Examiner*—Thong Q. Nguyen
(74) *Attorney, Agent, or Firm*—Hodgson Russ LLP

(57) ABSTRACT

The invention concerns a stereomicroscope (1) for magnifying an object (T), having at least one zoom (22) through which, in the operating state, an object beam (K1) emitted from the object (T) is directed, the stereomicroscope (1) comprising a first deflection device (P4), arranged physically behind (after) the zoom (22) in the light path, for deflecting the light beam directed through the zoom (22) into a direction (A3) that deviates by less than 45° from the direction opposite to the object beam (K1). The light beam (A1) directed through the zoom (22) is advantageously deflected substantially into the direction opposite to the object beam (K1).

11 Claims, 4 Drawing Sheets

STEREOMICROSCOPE

CROSS-REFERENCE TO RELATED APPLICATIONS

The present application is the U.S. National Stage of International Application No. PCT/EP2003/013403 filed Nov. 28, 2003, which claims priority of German Application No. 102 55 965.1 filed Nov. 29, 2002.

FIELD OF THE INVENTION

The invention concerns a stereomicroscope for magnifying an object by means of at least one zoom through which, in the operating state, an object beam emitted from the object is directed.

BACKGROUND OF THE INVENTION

A stereomicroscope of this kind is known, for example, from EP-A2-1 120 676 and from U.S. Pat. No. 5,822,114. For better comprehension of this cited existing art, the reader is referred to FIG. 2 of EP-A2-1 120 676, which comprises in large part arrangements similar to those in FIG. 1 of the present invention. The reference numbers of EP-A2-1 120 676 have been largely carried over to the description of the present FIG. 1 and the Parts List, so that one skilled in the art can easily recognize the known assemblage as well as differences with respect to the present invention.

In the design of stereomicroscopes, it is generally desirable to keep the overall height as low as possible, on the one hand in order to minimize the eye-object distance (i.e. the distance between the observer's eye and the object being viewed), and on the other hand to achieve—in the event the stereomicroscope is used as a surgical microscope—the smallest and most compact design possible, which is also intended to have a favorable effect on moving masses.

In normal operation of a conventional stereomicroscope that is not in a pivoted position, the beam paths that pass through the main objective and the zoom are arranged approximately vertically.

The aforementioned documents of the existing art indicated as their purpose a reduction in overall height. This was achieved by means of a horizontal arrangement of the zoom. The result was to reduce both the overall height of the microscope and also the eye-object distance.

The reduction in overall height resulting from this known action is, however, limited, as is also the reduction in the eye-object distance; the question arising therefrom is whether it is not also possible to achieve a further decrease in overall height, and in particular a reduction in the eye-object distance, by means of actions other than a horizontal arrangement of the zoom.

SUMMARY OF THE INVENTION

It is thus the object of the invention further to decrease the overall height and the eye-object distance of such stereomicroscopes, and thus to improve ergonomic usability.

This object is achieved by a stereomicroscope for magnifying an object by means of at least one zoom through which, in the operating state, an object beam emitted from the object is directed, the stereomicroscope comprising a first optical deflection device, arranged physically behind (after) the zoom in the light path, for deflecting the light beam directed through the zoom into a direction that deviates by less than 45°, in particular less than 20°, from the direction opposite to the object beam. This means that the light beam deflected after the zoom once again points approximately in the direction from which the object beam is coming. The "approximately" or "substantially" extends over a region +/−45°, or preferably +/−20°, adjacent to the direction opposite to the object beam, i.e. in terms of the direction of the object beam, +/−135° or preferably +/−160°. For purposes of the invention, it is not required that the axes of the beams or directions lie within one another; they can also lie next to one another, in other words as a parallel offset.

It is not necessary, for purposes of the invention, for the first deflection device to be arranged directly behind the zoom. Instead, further deflection devices or optical components, for example lenses, mirrors, prisms, or the like, can be provided between the first deflection device and the zoom. In the case of a stereomicroscope in which an object beam directed substantially perpendicularly out of the focal plane passes through the optics of the stereomicroscope, the aforesaid object is also achieved, in particular, in that the first deflection device aligns the light beam directed through the zoom in a direction approximately perpendicular to the focal plane. A typical exemplifying embodiment is therefore a deflection into a direction of 180° with respect to the direction of the object beam, the first deflection device deflecting the light beam directed through the zoom substantially into the direction opposite to the object beam.

In an advantageous embodiment of the invention, the first deflection device deflects the light beam directed through the zoom substantially toward the object. The light beam directed through the zoom is deflected, in this context, in such a way that without further deflection, it would radiate back onto the object. An exemplifying embodiment of such an embodiment is shown, for example, in FIGS. 1 and 2. Those higher-order embodiments in which return radiation directly back onto the object would not occur, but instead the back-radiated light beam is merely oppositely parallel to the object beam (as depicted e.g. in FIG. 3 of the present application), are to be understood as deviating therefrom.

In a further advantageous embodiment of the invention, the stereomicroscope comprises a second deflection device, arranged physically behind (after) the first deflection device in the light path, for deflecting into an observation beam path the light beam deflected by the first deflection device. That beam path could be arranged, for example, in the case of a horizontal zoom, approximately in the direction opposite to the light beam passing through the zoom, so that both the zoom and the observation beam path are located at approximately the same physical height relative to the main objective and relative to the object. It is apparent that this represents enormous progress with respect to conventional configurations.

In a further advantageous embodiment of the invention, the zoom is arranged substantially perpendicular to the object beam, the stereomicroscope comprising a third deflection device, arranged physically in front of (before) the zoom in the light path, for deflecting into the zoom the object beam emitted from the object, the second and the third deflection devices preferably being arranged physically next to one another. This position of the zoom is often referred to among specialists as "horizontal." The third deflection device directs the object beam out of its perpendicular direction (with respect to the focal plane of the microscope) into the horizontal zoom (located parallel to the focal plane). The physical arrangement of the second and third deflection devices next to one another results in a compact design.

In a further advantageous embodiment of the invention, the deflection devices comprise a front surface for reflecting light beams and a rear surface, the second and third deflection devices being arranged with their rear surfaces toward one another.

In a further advantageous embodiment of the invention, a tube is arranged physically behind (after) the second deflection device in the light path, the second and the third deflection device being embodied pivotably or rotatably in such a way that the object beam is guidable directly into the tube, bypassing the zoom. In the context of a zoom microscope this makes it possible always to return, by simple mechanical switching of an optical component, to a fixed magnification that is useful as a reference for medical landmark allocation. Click-stop devices on the zoom, which likewise lead back to reference settings, can thus be omitted.

In a further advantageous embodiment of the invention, a mirror layer that reflects light on both sides is arranged between and shared by the second and the third deflection device.

In a further advantageous embodiment of the invention, the second deflection device and the third deflection device are embodied together in one piece.

In a further advantageous embodiment of the invention, one of the three deflection devices comprises a roof edge or other devices, for example including an intermediate image system to eliminate an image reversal. On the other hand, it is also possible for such devices to be associated with the deflection devices.

The object cited earlier is also independently achieved by a stereomicroscope improved in this fashion for magnifying an object by means of at least one zoom through which, in the first operating state, an object beam emitted from the object is directed by means of a (third) deflection device into the zoom; the stereomicroscope comprising a further (second) deflection device, arranged physically behind (after) the zoom in the light path, for deflecting the deflected light beam into the opposite direction from the light beam coming from the object and directed into the zoom; a second operating state being implementable by the fact that the further (second) deflection device ends up physically in front of (before) the zoom in the light path and directs the object beam away from the zoom; the deflection device and the further deflection device being arranged physically next to one another, preferably embodied in integral fashion, and pivotably or rotatably.

A particular embodiment of this independent invention in fact uses only a single rotatable or pivotable deflection device, which implements the function of the (third) deflection device only in the first operating state, and the function of the (second) further deflection device only in the second operating state.

Further embodiments of the invention and variants thereof are described in the dependent claims.

BRIEF DESCRIPTION OF THE DRAWINGS

The Parts List and the drawings are, together with the features described in the claims, an integral constituent of the disclosure of this application.

The Figures are described in continuous and overlapping fashion. Identical reference characters denote identical components; reference characters with different indices indicate functionally identical components.

Figure 1:
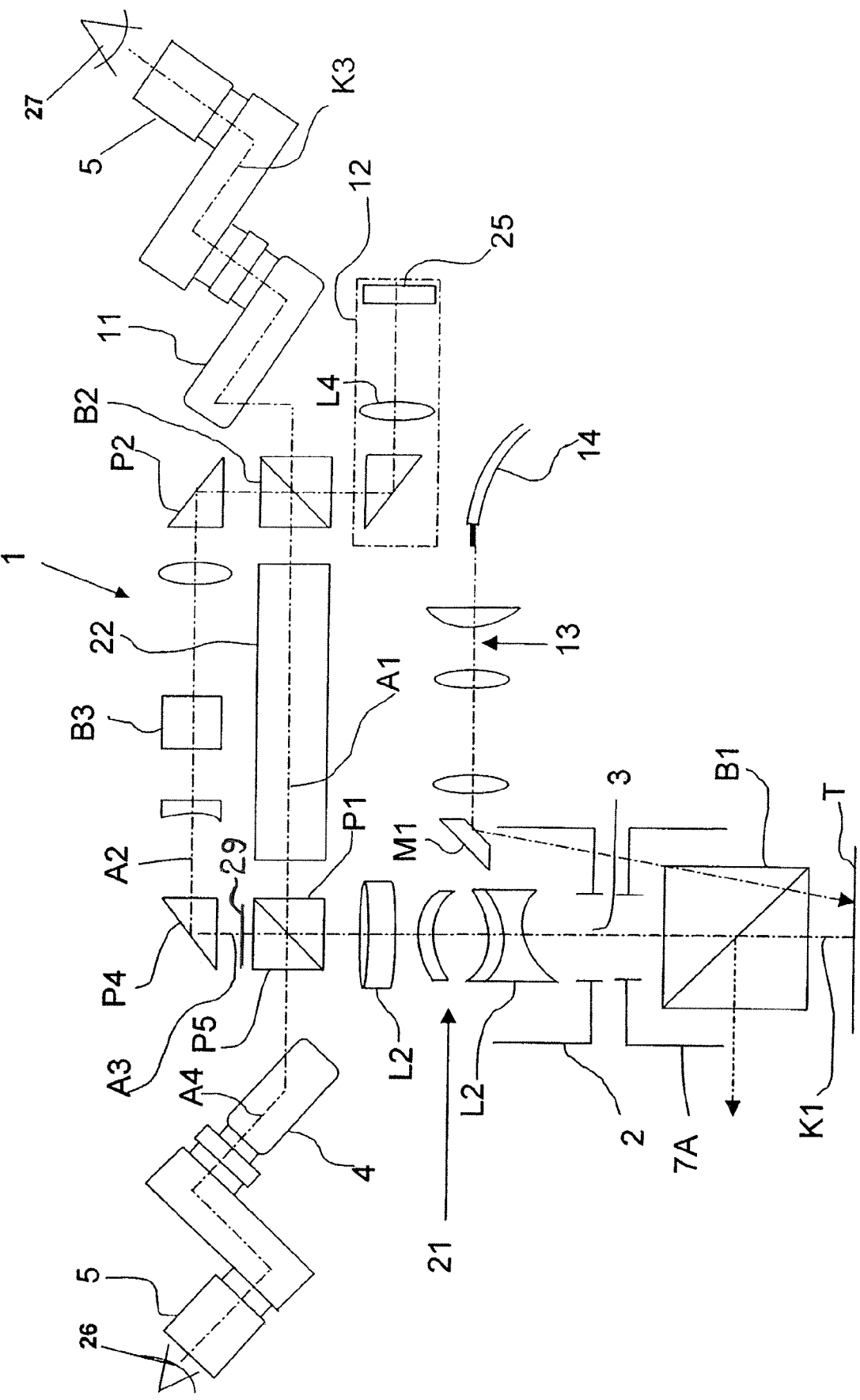
Figure 3:
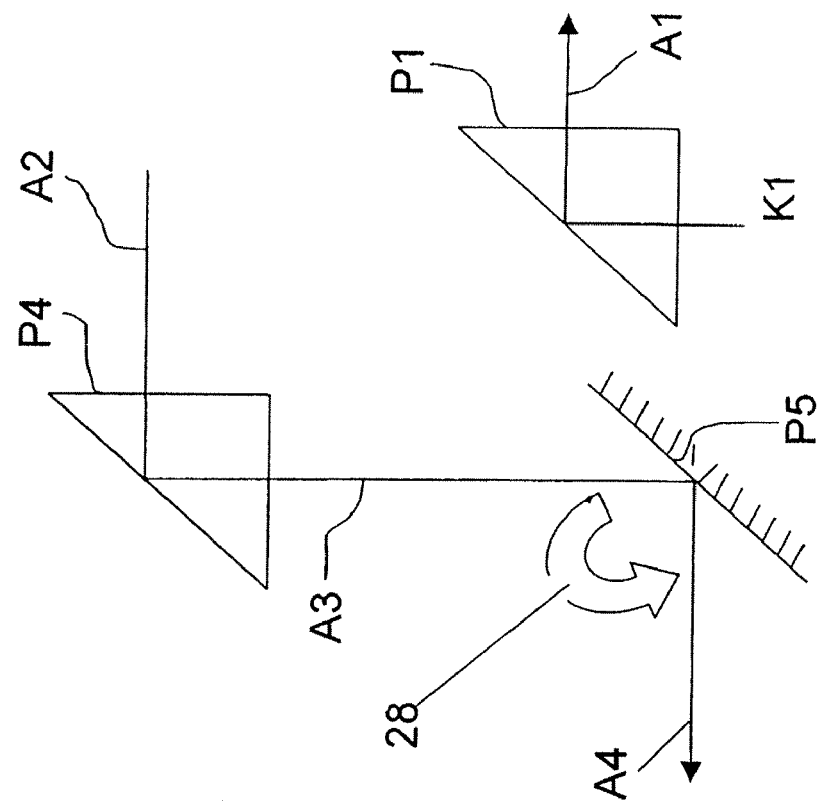
Figure 2:
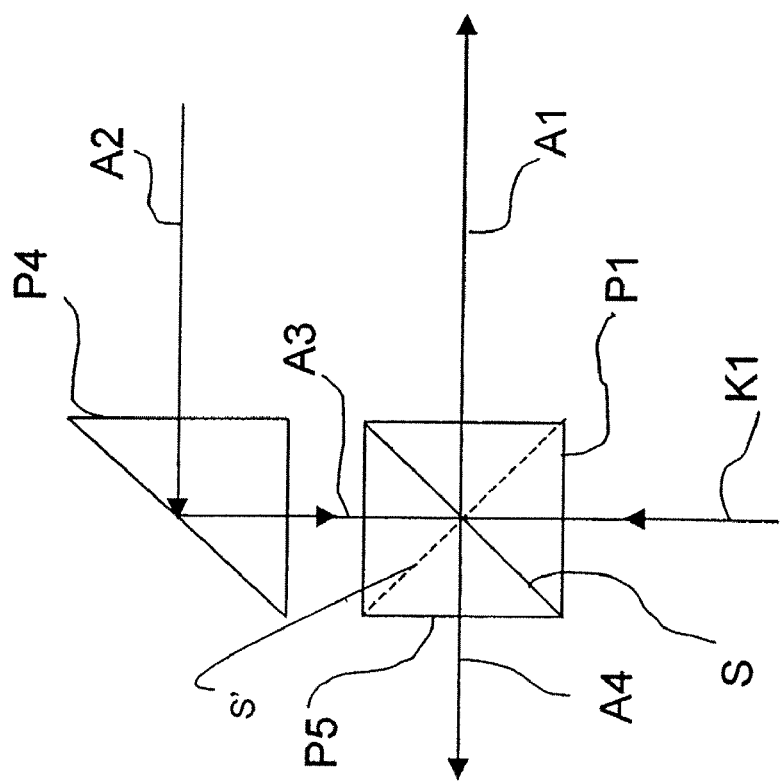
Figure 5:
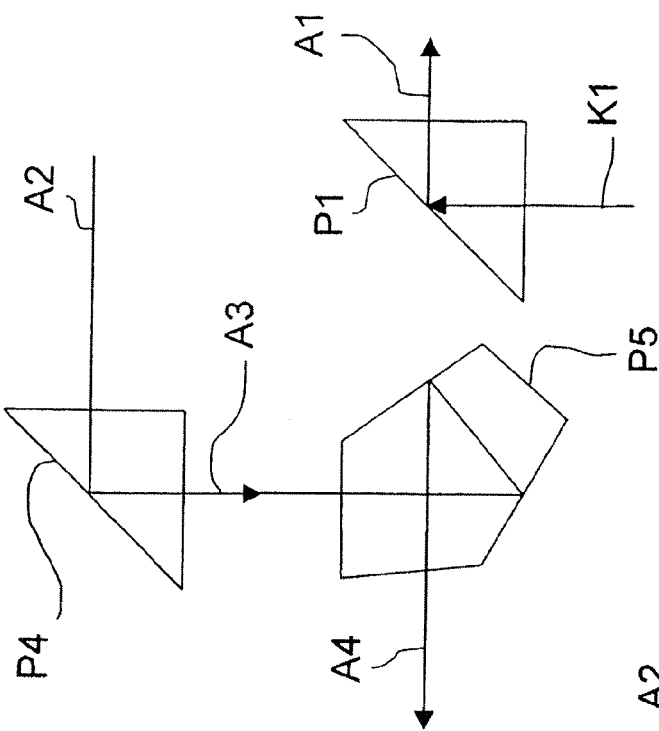
Figure 6:
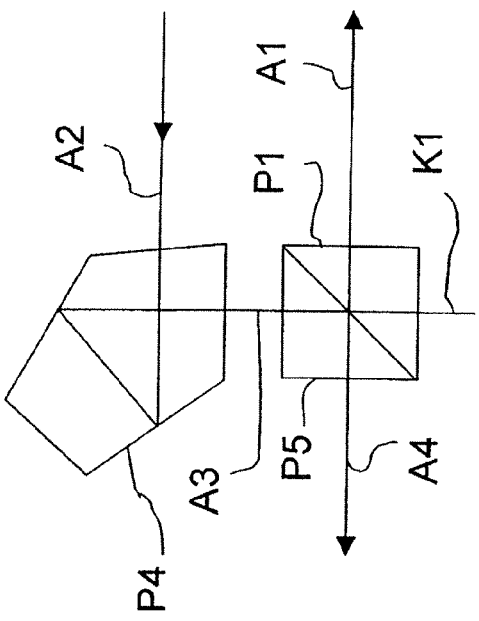
Figure 4:
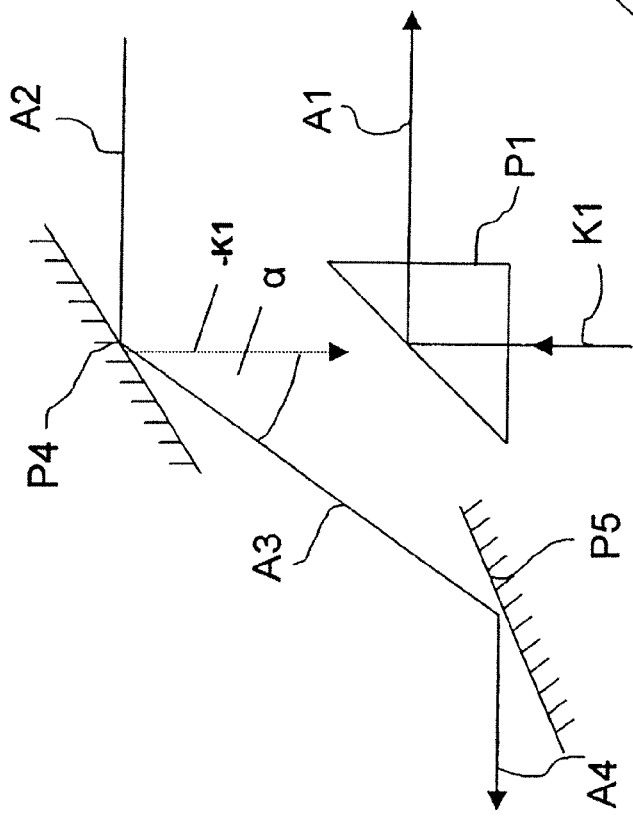

Further advantageous embodiments are evident from the schematic drawings, in which:

FIG. 1 shows an exemplifying embodiment of a stereomicroscope according to the present invention;

FIG. 2 shows a detail of the exemplifying embodiment of FIG. 1, specifically the particularly advantageous arrangement of a first, a second, and a third deflection device;

FIG. 3 shows a further exemplifying embodiment of an arrangement according to the present invention of a first, second, and third deflection device;

FIG. 4 shows a further exemplifying embodiment of an arrangement according to the present invention of a first, second, and third deflection device;

FIG. 5 shows a further exemplifying embodiment of an arrangement according to the present invention of a first, second, and third deflection device;

FIG. 6 shows a further exemplifying embodiment of an arrangement according to the present invention of a first, second, and third deflection device; and FIGS. 7A–7D show examples of prisms providing a 90° change in direction, and the effect of each prism on image position.

DETAILED DESCRIPTION OF THE INVENTION

FIG. 1 shows, as an exemplifying embodiment, a stereomicroscope 1 according to EP-A2-1 120 676, although modified in accordance with the present invention. Reference characters identical to those in FIG. 2 of EP-A2-1 120 676 designate identical or similar components of the assemblage. For reasons of simplicity, only one simultaneous observation tube (viewing tube) for an assistant 27 is depicted. T designates an object or the focal plane that emits an object beam K1. This object beam K1 passes through a connector 7A and then into an opening 3 in a housing 2 and into stereomicroscope 1 and its objective 21, and before that is split, if applicable, by means of an optional beam splitter B1, one portion of object beam K1 being diverted, if applicable, into a beam path (not shown further), and a further portion of the object beam traveling through the aforesaid opening 3 and through lenses L2 onto a deflection device P1.

Deflection device P1 is an example of a third deflection device as defined in the claims and the introduction to the specification. After deflection device P1, light beam A1 passes through a horizontal zoom 22. Light beam A1 emerging from zoom 22 encounters, along the extension of zoom 22, a further beam splitter B2 with which the light beam is split in such a way that one portion is guided into a simultaneous observation tube 11 for an assistant 27, and another portion is guided as light beam A2 into a deflection device P2. Light beam A2 is directed by means of deflection device P2 onto a further deflection device P4 that represents an example of a first deflection device as defined in the claims and the introduction to the specification. Deflection device P4 deflects light beam A2 onto a further deflection device P5 (cf. light beam A3), from which the light beam, now designated A4, is further directed into a tube 4 and an eyepiece 5 for a principal observer 26.

Deflection device P5 is an example of a second deflection device as defined in the claims and the introduction to the specification.

Deflection devices P1, P2, P4, and P5 are advantageously embodied as prisms, but are not limited thereto. A system 29 forming an intermediate image is associated with deflection device P5; system 29 could also be placed in the optical path between deflection devices P2 and P4 or between beam splitter B2 and deflection device P2.

As is clearly evident, as a result of the invention and the utilization of first deflection device P4, tube 4 and eyepiece 5 are located closer to the main objective and to object T than in the case of the known assemblage according to EP-A2-1 120 676. The eye-object distance, and also generally the overall height of microscope 1, are thus further reduced.

Stereomicroscope 1 additionally comprises a fiber optic cable 14 or light source by means of which light can be guided through a illumination system 13 via a mirror M1 onto object T. A device 12 for reflecting an image of a monitor 25 through a lens L4 into the beam path of stereomicroscope 1 is also optionally provided.

FIG. 2 shows in detail the arrangement of deflection devices P1, P4, and P5 of FIG. 1 with respect to one another. As in FIG. 1, A1 designates the light beam entering zoom 22, and A2 the light beam entering first deflection device P4. A3 designates the light beam that emerges from deflection device P4 and enters second deflection device P5. A4 designates the light beam proceeding out of deflection device P5.

In the configuration according to FIG. 2, deflection devices P1 and P5 are arranged in such a way that they rest with their rear surfaces against each other. S designates an optionally provided double-sided mirror layer between the rear surfaces of the two deflection devices P1 and P5, object beam K1 being deflected into a light beam A1, and light beam A3 into light beam A4.

Even in a configuration without a mirror layer, e.g. involving total reflection, deflection devices P1 and P5 are to be embodied in such a way that object beam K1 and light beam A3 are totally reflected, or at least embodied so that passage of rays through P1 and P5 is prevented, e.g. by way of a partition.

In a particularly advantageous embodiment of the invention that is also usable independently of the other assemblages, provision is made for the arrangement made up of deflection devices P1 and P5 to be configured rotatably, in such a way that object beam K1 is reflected to constitute a light beam A4, i.e. so that when necessary, the light from object T is incident directly into tube 4 for the principal observer 26, bypassing zoom 22. The result of this is that a user of the stereomicroscope can, without adjusting zoom 22, very easily switch from low magnification to high magnification and vice versa, with the ability to the use the lower magnification, for example, as a reference magnification. The switched-over state is indicated in FIG. 2 by the dashed line S', which shows mirror surface S when deflection devices P1 and P5 are rotated. In this position, as is apparent, object beam K1 transitions directly into light beam A4 that is used as the observation beam.

FIG. 3 shows a further exemplifying embodiment of the arrangement of deflection devices P1, P4, and P5. In contrast to the exemplifying embodiment according to FIG. 1 and FIG. 2, here deflection devices P1 and P5 are not physically arranged immediately next to one another. With this configuration, tube 4 can be located even lower, since second deflection device P5 is not dependent on third deflection device P1 and can thus also be placed lower down, as is apparent in FIG. 3 from the lower position of light beam A4 as compared with light beam A1. The eye-object distance can thus be shortened almost arbitrarily. Irrespective of this, deflection device P5 can be pivotable, as indicated by pivot arrow 28.

In addition, the pivotability, known per se, of tube 4 and/or eyepiece 5 further enhances ergonomics.

FIG. 4 shows a further exemplifying embodiment of an arrangement of deflection devices P1, P4, and P5. Here, in contrast to the exemplifying embodiment according to FIG. 3, deflection devices P4 and P5 are configured in such a way that they do not reflect light at a right angle. Unlike in the exemplifying embodiments according to FIGS. 1, 2, and 3, in which light beam A3 proceeds in the direction opposite to object beam K1, in the exemplifying embodiment according FIG. 4, light beam A3 is inclined at an angle α with respect to object beam K1. Angle α is smaller than 45°, preferably smaller than 20°. The smaller the angle, the closer deflected light beam A3 comes to proceeding in the direction opposite to object beam K1. As angle α becomes smaller, the size of deflection element P4 can be correspondingly smaller. The oblique position of deflection device P5 with respect to light beam A3 is depicted only by way of example. It could assume different angular positions, and thereby influence the ergonomics for attachment of an observation tube (viewing tube).

Figure 7A:
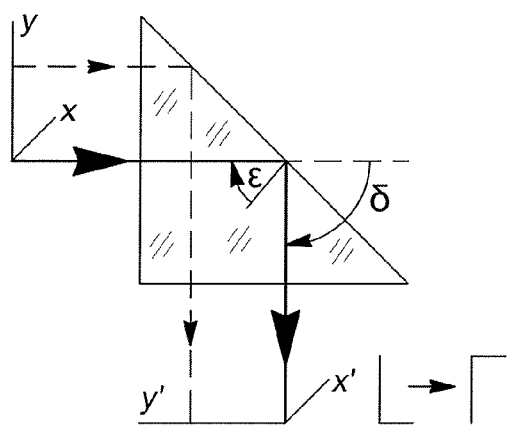
Figure 7B:
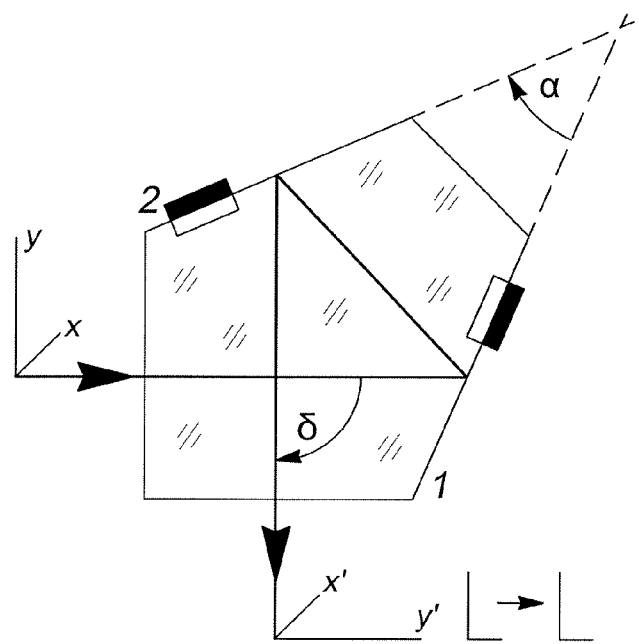
Figure 7C:
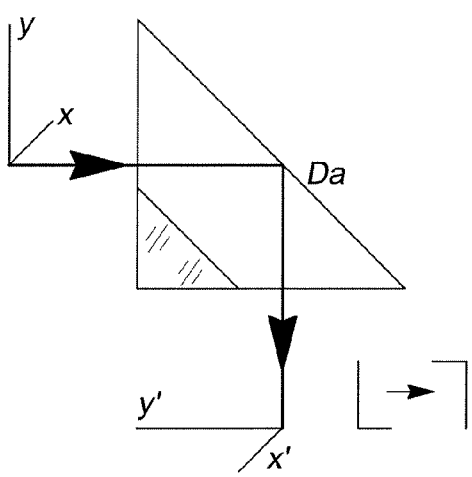
Figure 7D:
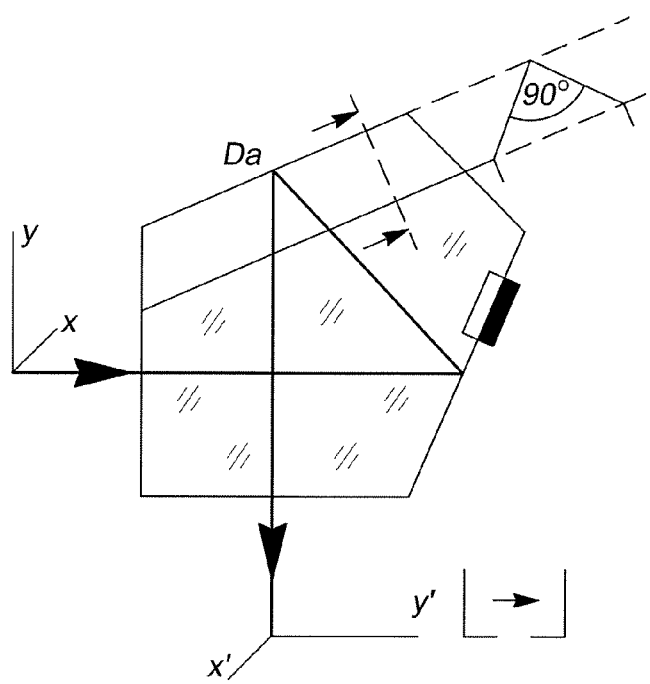

FIG. 5 shows a further exemplifying embodiment of the arrangement of deflection devices P1, P4, and P5. Here, in contrast to the exemplifying embodiment according to FIG. 3, deflection device P5 is embodied e.g. as a pentaprism or as a prism having a roof edge, thereby enabling an image reversal. Details of such prisms for image reversal or for preventing image reversal may be obtained from the book by Naumann/Schröder, "Bauelemente der Optik" [Optical components], Taschenbuch der technischen Optik, 5th ed., page 162. In this text, the image position is investigated with reference to four figures which show examples of prisms providing a 90° change in direction (see FIGS. 7A through 7D) using an "L" as the object symbol (long Y limb in the folding plane=drawing plane=Y-Z plane; short X limb pointing perpendicularly into the drawing plane, i.e. defining the X-Z plane). These "L" symbols are depicted in perspective, but the prisms are shown in section. The image position x', y' in FIG. 7A shows that one reflection results in one-sided image reversal (here a Y reversal L→Γ, i.e. flipping about the X axis). In FIG. 7B, however, i.e. two reflections, there is no image reversal (L→L). The Y direction can easily be found using a parallel beam (dashed line in FIG. 7A), or even more quickly "by experiment" by rotating a pencil, for example, against the mirror surfaces. The X direction remains unchanged in FIGS. 7A and 7B. FIG. 7C shows a half-cube prism with roof edge Da, and FIG. 7D shows a pentagonal prism (pentaprism) with roof edge.

FIG. 6 shows a particularly advantageous exemplifying embodiment of an arrangement of deflection devices P1, P4, and P5. Here, in contrast to the exemplifying embodiment according to FIG. 2, deflection device P4 is configured as a pentaprism. It could also be configured as a prism having a roof edge, to prevent an image reversal produced by an odd number of preceding deflection elements and intermediate image elements. The result of this is that light beam A4 does not furnish a mirror-reversed image of object T, even though, in contrast to the exemplifying embodiment according to FIG. 5, the particularly advantageous arrangement of deflection devices P1 and P5 with respect to one another is retained.

PARTS LIST

1 Stereomicroscope
2 Housing
3 Opening
4 Tube
5 Eyepiece

7A Connector
11 Assistant's tube
12 Device for reflecting in the image of a monitor (25)
13 Illumination system
14 Fiber optic cable
21 Objective
22 Zoom
25 Monitor
26 Principal observer
27 Assistant
28 Pivot arrow
29 System forming an intermediate image
A Light beam (A1, A2, A3, A4)
B Beam splitter (B1, B2)
B3 Optional beam splitter for lateral reflection out of the image plane
K1 Object beam
K3 Observation beam path for (27)
L Lenses (L2, L4)
M1 Mirror
P Deflection device(s) (P1, P2, P4, P5)
S Mirror layer
S' Rotated mirror layer
T Object or focal plane
α Angle between direction (−K1) opposite to direction (K1) and light beam (A3) (FIG. 4)

What is claimed is:

1. A stereomicroscope (1) for magnifying an object (T) emitting an object beam (K1) in a first direction, the stereomicroscope comprising:
at least one zoom (22) through which, in an operating state, a light beam corresponding to the object beam is directed, wherein the zoom (22) is arranged along an axis substantially perpendicular to the first direction of the object beam (K1);
a first deflection device (P4) arranged after the zoom (22) in a path of the light beam to deflect the light beam transmitted through the zoom into a second direction that deviates by more than +/−135° from the first direction of the object beam or from a parallel offset of the first direction;
a viewing tube;
a second deflection device (P5) arranged after the first deflection device (P4) in the path of the light beam for deflecting the light beam deflected by the first deflection device into the viewing tube; and
a third deflection device (P1) arranged before the zoom (22) in the path of the object beam for deflecting the object beam (K1) into the zoom (22), wherein the second deflection device (P5) and the third deflection device (P1) are arranged next to one another;
wherein the viewing tube (4) is arranged after the second deflection device (P5) in the path of the light beam, and the second deflection device (P5) and third deflection device (P1) are rotatable in such a way that the object beam (K1) is selectively guidable into the viewing tube, bypassing the zoom (22).

2. The stereomicroscope according to claim 1, wherein the second direction is substantially opposite to the first direction or to a parallel offset of the first direction.

3. The stereomicroscope according to claim 1, wherein the second direction is substantially toward the object (T).

4. The stereomicroscope according to claim 1, wherein the second deflection device (P5) deflects the light beam in a direction opposite to the direction of the light beam as the light beam passes through the zoom (22).

5. The stereomicroscope according to claim 1, wherein each of the second and third deflection devices (P5, P1) comprises a light-reflecting front surface and a rear surface, and the second deflection device (P5) and the third deflection device (P1) are arranged with their respective rear surfaces facing toward one another.

6. The stereomicroscope according to claim 1, wherein the first, second, or third deflection device (P4, P5, P1) comprises optical means for eliminating an image reversal.

7. The stereomicroscope according to claim 6, wherein the optical means includes roof edges.

8. The stereomicroscope according to claim 6, further comprising a system associated with the first, second, or third deflection device (P4, P5, P1), the system forming an intermediate image.

9. A stereomicroscope (1) for magnifying an object (T) emitting an object beam (K1) in a first direction, the stereomicroscope comprising:
at least one zoom (22) through which, in an operating state, a light beam corresponding to the object beam is directed, wherein the zoom (22) is arranged along an axis substantially perpendicular to the first direction of the object beam (K1);
a first deflection device (P4) arranged after the zoom (22) in a path of the light beam to deflect the light beam transmitted through the zoom into a second direction that deviates by more than +/−135° from the first direction of the object beam or from a parallel offset of the first direction;
a viewing tube;
a second deflection device (P5) arranged after the first deflection device (P4) in the path of the light beam for deflecting the light beam deflected by the first deflection device into the viewing tube; and
a third deflection device (P1), arranged before the zoom (22) in the path of the object beam for deflecting the object beam (K1) into the zoom (22), wherein the second deflection device (P5) and the third deflection device (P1) are arranged next to one another;
wherein each of the second and third deflection devices (P5, P1) comprises a light-reflecting front surface and a rear surface, and the second deflection device (P5) and the third deflection device (P1) are arranged with their respective rear surfaces facing toward one another, wherein the respective rear surfaces of the second deflection device (P5) and the third deflection device (P1) are joined to one another.

10. A stereomicroscope (1) for magnifying an object (T) emitting an object beam (K1) in a first direction, the stereomicroscope comprising:
at least one zoom (22) through which, in an operating state, a light beam corresponding to the object beam is directed wherein the zoom (22) is arranged along an axis substantially perpendicular to the first direction of the object beam (K1);
a first deflection device (P4) arranged after the zoom (22) in a path of the light beam to deflect the light beam transmitted through the zoom into a second direction that deviates by more than +/−135° from the first direction of the object beam or from a parallel offset of the first direction;
a viewing tube;
a second deflection device (P5) arranged after the first deflection device (P4) in the path of the light beam for deflecting the light beam deflected by the first deflection device into the viewing tube; and a third deflection device (P1), arranged before the zoom (22) in the path of the object beam for deflecting the object beam (K1) into the zoom (22), wherein the second deflection device (P5) and the third deflection device (P1) are arranged next to one another;

wherein a mirror layer (S or S') that reflects light from front and rear surfaces thereof is arranged between and shared by the second deflection device (P5) and the third deflection device (P1).

11. The stereomicroscope according to claim 10, wherein the second deflection device (P5) and the third deflection device (P1) are embodied together in one piece.

* * * * *